Oct. 3, 1933.  Y. ISHII  1,929,314
SUN VISOR
Filed Sept. 19, 1932  2 Sheets-Sheet 1

Inventor
Yomoichi Ishii

By Clarence A. O'Brien
Attorney

Oct. 3, 1933. Y. ISHII 1,929,314
SUN VISOR
Filed Sept. 19, 1932 2 Sheets-Sheet 2
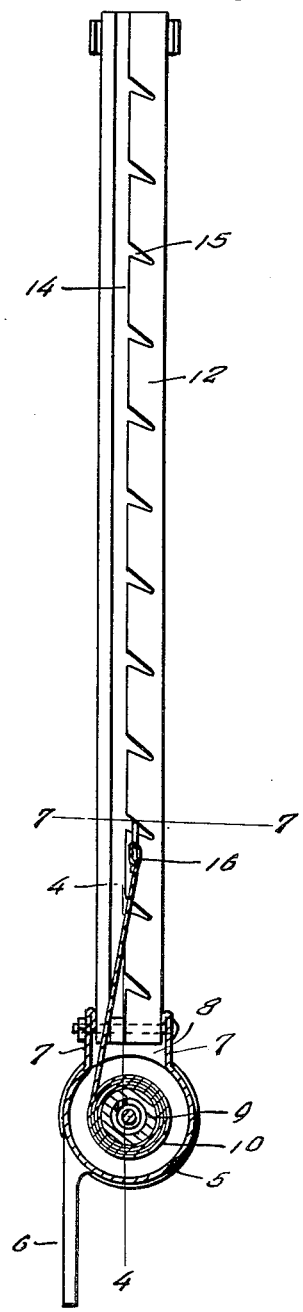
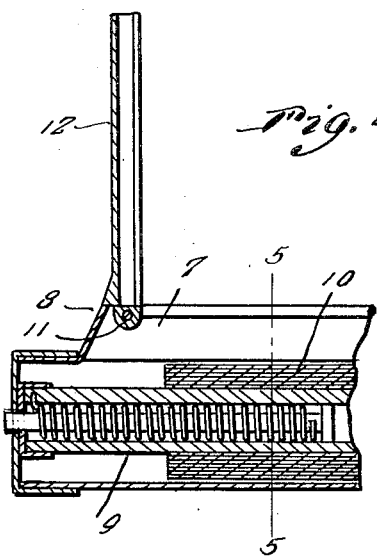
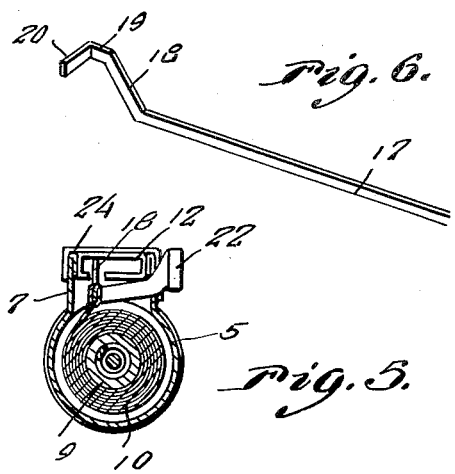
Inventor
Tomoichi Ishii
By Clarence A. O'Brien
Attorney Patented Oct. 3, 1933

1,929,314

UNITED STATES PATENT OFFICE 1,929,314

SUN VISOR

Yomoichi Ishii, East Ely, Nev.

Application September 19, 1932
Serial No. 633,889
2 Claims. (Cl. 296—97)

The present invention relates to a sun visor for automobiles to be attached to automobiles on and near the instrument board and it may be raised or lowered as may be needed for the purpose of preventing sun or light glare generally from the hood or front headlights of approaching cars.

An object of the invention resides in the provision of an apparatus of this nature which is exceedingly simple in its construction, easy to manipulate, inexpensive to manufacture, thoroughly efficient and reliable in use and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 3 is a vertical section taken substantially on the line 3—3 of Figure 1.

Figure 4 is a section taken substantially on the line 4—4 of Figure 3.

Figure 5 is a section taken substantially on the line 5—5 of Figure 4 but showing the guides in folded or lowered position.

Figure 6 is a perspective view of one end of the guide rod.

Figure 1:
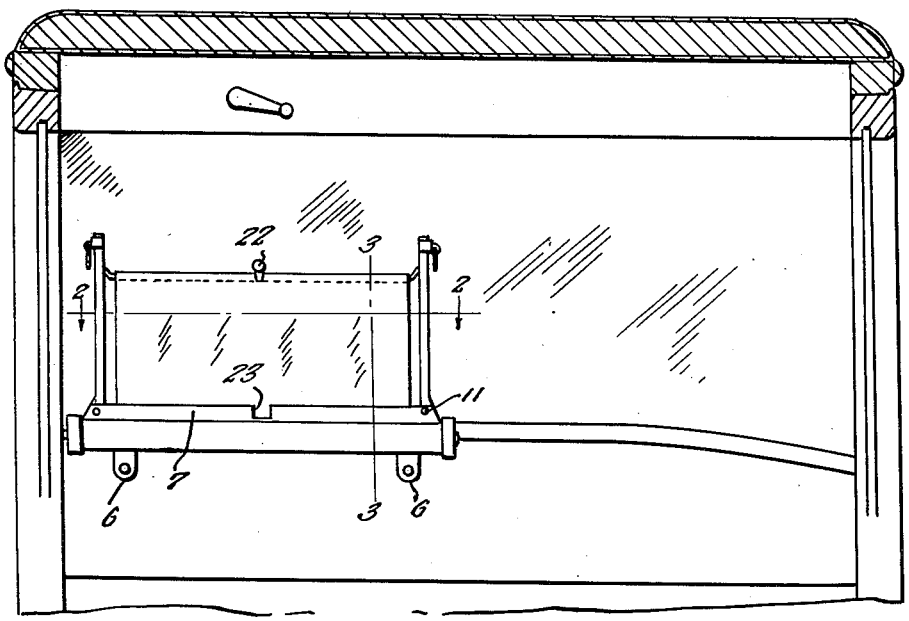
Figure 1 is a vertical transverse section through the body of an automobile looking toward the instrument board and windshield showing my apparatus mounted in place.
Figure 2:
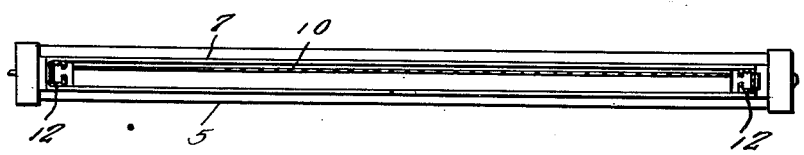
Figure 2 is a horizontal section through the apparatus taken substantially on the line 2—2 of Figure 1.
Figure 7:
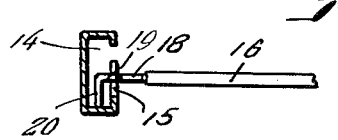
Figure 7 is a detail section taken substantially on the line 7—7 of Figure 3.

Referring to the drawings in detail it will be seen that the numeral 5 denotes a horizontal closed ended cylinder with depending brackets 6 tangentially disposed in respect thereto for fastening the cylinder on the instrument board or the like of an automobile and the upper portion of the cylinder is formed with a longitudinally extended slot bounded by longitudinal flanges 7 rising from the edges thereof and end flanges 8 rising from the ends thereof so as to form a casing. In the cylinder is mounted a spring actuated roller 9 with a sheet of material 10 mounted thereon, the spring in the roller being tensioned to normally hold the sheet 10 wound on the roller. This sheet 10 will be of such a nature so as to prevent glare and the like from light. Numerous well known materials may be used for this purpose.

In the ends of the casing formed by the flanges 7 and 8 there are pivotally mounted as at 11 a pair of guides 12. These guides are of a hollow tubular formation substantially rectangular in cross section and have their inner sides formed with longitudinally extending slots 14 edges of which are provided with a plurality of spaced notches 15. On the end of the curtain or sheet 10 there is formed a bead 16 in which is disposed a rod 17 the ends of which merge into oblique extensions 18 which in turn merge into outwardly directed extensions 19 for engagement in the notches 15 and terminate in lateral terminals 20 for riding in the interior of the tubular or hollow guides 12.

The center of the rods 17 has an arm 22 projecting therefrom which is used in lifting and lowering the curtain. When the curtain is lowered the arm 22 seats in the notch 23 in a center of the rear flange 7 and then the guides 12 may be folded down into the casing and a cap 24 placed thereover.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A device of the class described including a horizontal cylinder, a spring roller mounted in the cylinder, a curtain normally wound on the roller, said cylinder having a slot in the upper portion thereof, a casing rising from and surrounding the slot, guides pivotally mounted in the ends of the casing to be folded therein or extended upwardly therefrom, a rod in the free end of the curtain, said rod having its ends projecting from the curtain, said ends being bent upwardly and then bent to form angle parts which engage portions of the internal walls of the guides, said guides having notches to receive the ends of the rods for holding the curtain in different adjusted positions.

2. A device of the class described including a horizontal cylinder, a spring roller mounted in the cylinder, a curtain normally wound on the roller, said cylinder having a slot in the upper portion thereof, a casing rising from and surrounding the slot, guides pivotally mounted in the ends of the casing to be folded therein or extended upwardly therefrom, a rod in the free end of the curtain having ends extending into the guides and slidable therein, said guides having notches to receive the ends of the rod for holding the curtain in different adjusted positions, an arm extending from the center of the rod, the casing having a notch to receive said arm, a cap to fit over the casing when the guides are folded down therein.

YOMOICHI ISHII.